United States Patent [19]

Tobioka

[11] 4,150,881
[45] Apr. 24, 1979

[54] FILM FEEDING DEVICE FOR SOUND MOTION PICTURE CAMERA

[75] Inventor: Takashi Tobioka, Omiya, Japan

[73] Assignee: Fuji Photo Optical Co., Ltd., Omiya, Japan

[21] Appl. No.: 921,975

[22] Filed: Jul. 5, 1978

[30] Foreign Application Priority Data

Jul. 11, 1977 [JP] Japan .................................. 52-82729

[51] Int. Cl.² ............................................. G03B 31/02
[52] U.S. Cl. ........................................ 352/27; 352/29; 352/72; 352/174
[58] Field of Search ....................... 352/27, 29, 72, 174

[56] References Cited

U.S. PATENT DOCUMENTS

| | | | |
|---|---|---|---|
| 4,052,125 | 10/1977 | Ishibashi | 352/27 |
| 4,059,349 | 11/1977 | Komine et al. | 352/27 |

*Primary Examiner*—Monroe H. Hayes

[57] ABSTRACT

In a sound recording portion of a sound motion picture camera, a film strip is continuously advanced by a capstan and a pinch roller. The pinch roller is movable between its retracted position where it is spaced apart from the capstan and its operative position where it is pressed against the capstan to pinch the film strip therebetween. The pinch roller is supported on a pivotable member which is capable of pivoting from a first position in which it holds the pinch roller in the retracted position to a second position in which it holds the pinch roller in the operative position. The pivotable member is moved between the two positions driven by a reciprocating plate member which is moved back and forth in translational movement by an electric motor through a cam mechanism. The electric motor is energized in response to depression of the shutter button of the camera and deenergized when the pivotable member is pivoted to its second position. The electric motor is again energized when the shutter button is set free and kept energized until the reciprocating plate member is returned to its initial position where the pivotable member is positioned in its first position.

5 Claims, 5 Drawing Figures

FILM FEEDING DEVICE FOR SOUND MOTION PICTURE CAMERA

BACKGROUND OF THE INVENTION

1. Field of the Invention

This invention relates to a film feeding device for a sound motion picture camera and more particularly to a film feeding device adapted to advance a film strip past the sound recording apparatus of a sound motion picture camera for permitting continuous recording to sound.

2. Description of the Prior Art

As is well known in the art, a sound motion picture camera includes a photographing portion and a sound recording portion. In the photographing portion, the film is fed intermittently, while in the sound recording portion the film is advanced continuously. The continuous advance of the film in the sound recording portion is generally carried out by means of a capstan and a pinch roller. The pinch roller is movable between its operative position in which it is pressed against the rotating capstan to pinch the film therebetween and its retracted position in which it is spaced apart from the capstan and permits the film strip to be inserted into or removed from a position therebetween.

The pinch roller is ordinarily supported in the retracted position and moved to the operative position to feed the film when the shutter button of the motion picture camera is depressed.

In the conventional sound motion picture cameras, the pinch roller is mechanically connected with the shutter button and is moved to the operative position when the shutter button is depressed. Therefore, an increased force is required to depress the shutter button.

SUMMARY OF THE INVENTION

Accordingly, the primary object of the present invention is to provide a film feeding device having an improved mechanism for automatically moving the pinch roller in response to depression of the shutter button between its retracted position in which the pinch roller is spaced from the capstan and its operative position in which the pinch roller is engaged with the capstan for continuously driving the film strip past the recording head of a sound motion picture camera, said mechanism making it possible to depress the shutter button with less force.

The film feeding device of this invention includes a rotatable capstan and a pinch roller cooperating with the capstan for continuously advancing film strip past a sound recording head. The pinch roller is supported for rotation on a movable support member which is movable between a first position in which the pinch roller is pressed against the capstan and a second position in which the pinch roller is spaced from the capstan. The movable support member is driven by a reciprocating member which is in turn driven for reciprocating movement by an electric motor through a cam means. The electric motor is energized in response to depression of the shutter button. When energized, the electric motor rotates the cam member to move the reciprocating member in one direction. When the reciprocating member reaches a predetermined position, in which said movable support member is positioned in the first position where it supports the pinch roller to be pressed against the capstan, the motor is turned off and the movable support member is held in its first position so long as the shutter button is kept depressed. When the shutter button is set free to return to its original position, the motor is again turned on and the reciprocating member is moved in the opposite direction to return to its original position in which said movable support member is positioned in the second position. When the reciprocating member reaches the original position, the motor is again turned off.

When utilizing the film feeding device of this invention, the shutter button of the sound motion picture camera can be depressed with a small force, since in the film feeding device of this invention the pinch roller is electrically driven.

DESCRIPTION OF THE PREFERRED EMBODIMENT

Figure 1:
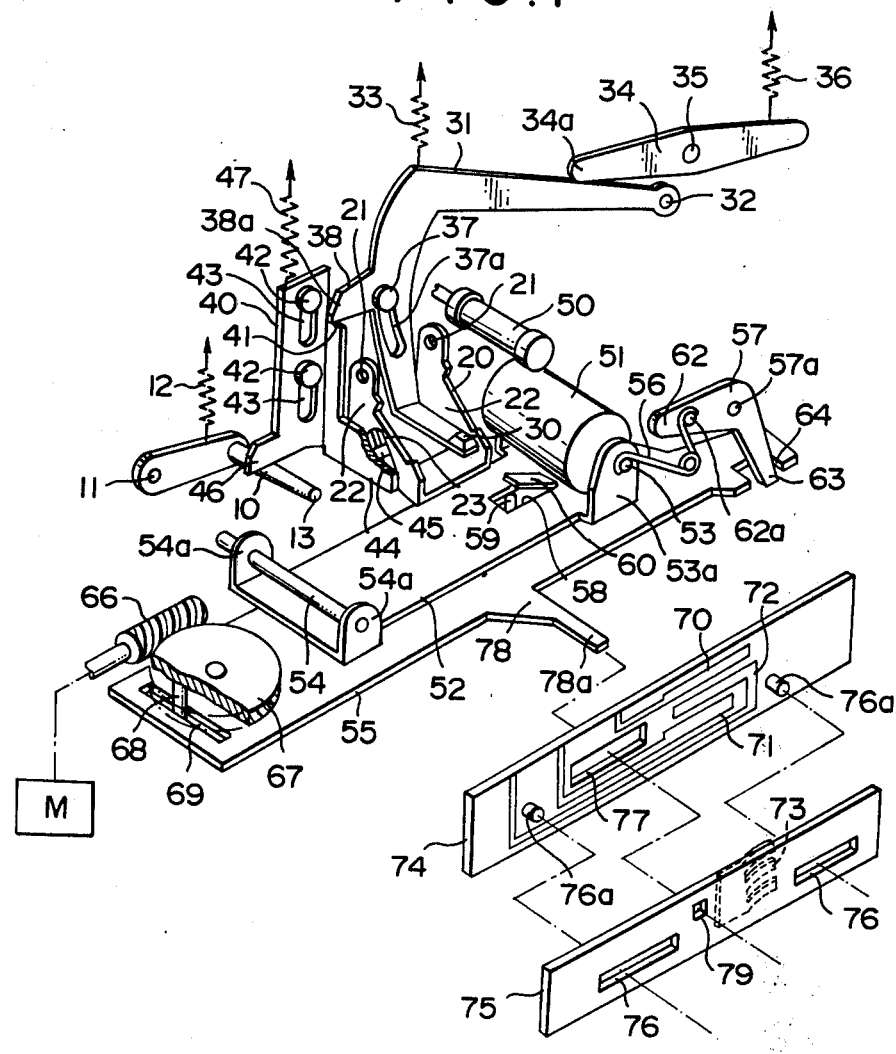
FIG. 1 is a partly exploded schematic view showing an embodiment of the present invention with parts broken away.

Now referring to FIGS. 1 to 3 of the drawings, a preferred embodiment of the present invention will be described hereinbelow. In FIG. 1, a film feeding device for the sound recording portion of a sound motion picture camera of this embodiment includes a loop sensor 10, a movable film guide member 20 and a recording head pad 30 which are movable between a retracted position and an operative position. The loop sensor 10, which senses the loop size or the length of film between the exposure aperture and the sound head of the sound motion picture camera to control the rate of operation of the film claw (not shown) in the photographing portion of the camera, is swingably supported on a support pin 11 which is fixed on the camera body (not shown). The loop sensor 10 is urged by a tension spring 12 in the counterclockwise direction so that an end 13 of the sensor 10 abuts against the film (not shown) when the loop size is increased. Said movable film guide member 20 is swingably supported on pivot pins (not shown) which are respectively engaged with a pair of holes 21 provided in a pair of side walls 22 thereof. The movable film guide member 20 cooperates in its operative position with a fixed film guide member (not shown) to define a path along which the film strip is guided.

Said head pad 30 urges the film sound track against a sound recording head (not shown) in its operative position. The head pad 30 is mounted on an end of a support lever 31 which is swingably supported on a pivot pin 32 at the other end and urged in the clockwise direction by means of a tension spring 33. An arm 34a of a lever 34 engages the support lever 31 near its other end. The lever 34 is rotatable about a pivot pin 35 and urged in the counterclockwise direction by a tension spring 36. The abutment between the support lever 31 and the arm 34a of the lever 34 prevents clockwise swinging movement of the support lever 31. The lever 34 is operatively connected to a lid member (not shown) of a film cartridge chamber of the camera so that the lever 34 is rotated in the clockwise direction overcoming the force of the spring 36 when the lid member is closed. When the lever 34 rotates in the clockwise direction, the support lever 31 is allowed to swing in the clockwise direction about the pivot pin 32 under the force of the spring 33 thereby moving said head pad 30 upward to its operative position. The movement of the support lever 31 is guided by a fixed pin 37 which is inserted into an elongated arcuate slot 37a provided in the support lever 31.

The support lever 31 further includes a projection 38 extending integrally therefrom. The free end portion 38a of the projection 38 abuts against an abutment shoulder 41 of a sliding member 40 which is slidable up and down. The sliding member 40 is slidably supported by a pair of stud pins 42 which respectively extend through a pair of elongated holes 43 provided in a body portion thereof. An L-shaped extension 44 extends integrally from the body portion of the sliding member in a plane normal to the plane of the body portion. The upper end of the L-shaped extension 44 defines said abutment shoulder 41. On the outer surface of the extension 41 is fixed an engaging pin 45 which is inserted into an elongated arcuate opening 23 formed in one of the side walls 22. An abutment projection 46 projects integrally from the body portion of the sliding member 40 in a direction normal to the L-shaped extension 44. The lower surface of the projection 46 abuts against said loop sensor 10 to prevent counterclockwise pivoting movement thereof. The sliding member 40 is urged upward by a tension spring 47 but is prevented from sliding freely upward through the abutment between its abutment shoulder 41 and the free end portion 38a of the projection 38 on said support lever 31.

When the lid member of the film cartridge chamber is closed and said lever 34 is rotated in the clockwise direction, said support lever 31 is swung in the clockwise direction by the force of the tension spring 33 to move the head pad 30 to its operative position. At the same time the sliding member 40 is allowed to slide upward under the force of the spring 47. When the sliding member 40 is moved upward, said movable film guide member 20 is pivoted to its operative position through the engagement between the elongated arcuate opening 23 thereof and the engaging pin 45 of the sliding member 40, and the loop sensor 10 is allowed to pivot in the counterclockwise direction to its operative position.

The film strip is continuously advanced by means of a capstan 50 and a pinch roller 51. The capstan 50 is rotatably mounted in the camera body and is rotated at a uniform speed by an electric motor which is not shown.

As will be described in detail hereinbelow, the pinch roller 51 is movable between its retracted position wherein it is spaced from the capstan 50 and its operative position wherein it is in contact with the capstan 50.

The pinch roller 51 is rotatably secured to one end of a bracket member 52 by a shaft 53 passing between a pair of spaced tabs 53a (only one tab can be seen in the Figures) which are bent substantially at right angles to the body of the bracket member 52. The bracket member 52 is pivotably supported by a shaft 54 at its end opposite to the end to which the pinch roller 51 is rotatably secured. The shaft 54 passes through a pair of spaced tabs 54a and is fixed to the camera body at one of its ends.

The bracket member 52 is operatively connected to a reciprocating plate member 55 by way of a center-over spring 56 and an L-shaped lever 57 so that translational movement of the reciprocating plate member 55 causes the bracket member 52 to pivot about the shaft 54. The bracket member 52 is provided with an opening 58 adjacent the pinch roller 51 through which opening 58 a pin 59 fixed to the reciprocating plate member 55 projects upward. An inwardly inclining lug 60 extends from one end of the opening 58 so that the lower surface of the lug 60 presents an inclined surface to the pin 59. This arrangement serves to facilitate counterclockwise pivoting movement of the bracket member 52 as will be described hereinbelow.

The center-over spring 56 is of V-shape and its ends are frictionally engaged respectively with the shaft 53 supporting the pinch roller 51 and a pin 62a fixed adjacent to the free end of an arm 62 of the L-shaped lever 57. The L-shaped lever 57 is rotatably supported on a pivot pin 57a at its intermediate portion and the other or the second arm 63 thereof extends into a cut-out portion 64 formed in the reciprocating plate member 55 adjacent one end thereof.

Now the movements of the bracket member 52 and the reciprocating plate member 55 are discussed prior to explanation of the driving mechanism for the reciprocating plate member 55.

Figure 2A:
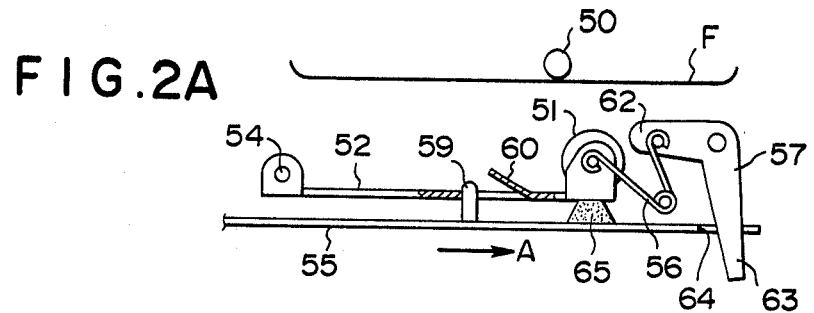
FIGS. 2A to 2C are schematic views for illustrating movement of the reciprocating plate member and the bracket member.
Figure 2B:
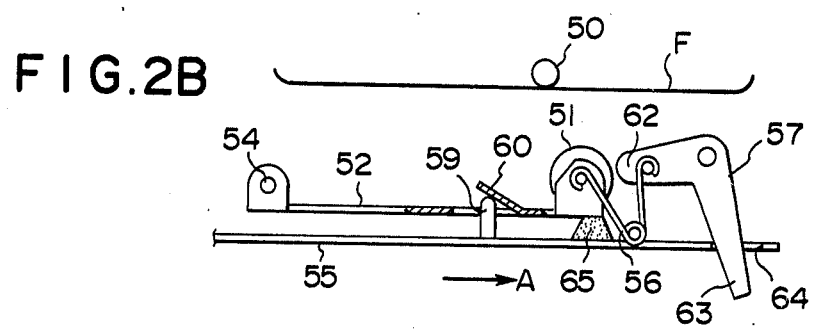
Figure 2C:
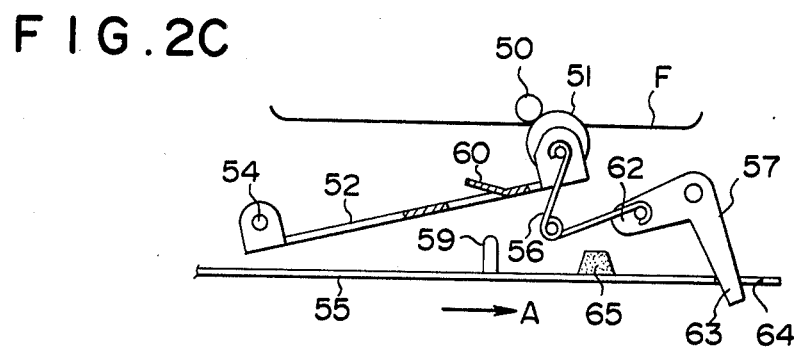

As shown in FIG. 2A, the bracket member 52 initially rests parallel to the reciprocating plate member 55 with one end, the end supporting the pinch roller 51, supported on a buffer 65. At this time the pinch roller 51 is spaced from the capstan 50. When the reciprocating plate member 55 is slid in the direction indicated by arrow A, the left side edge of the cut-out portion 64 presses the second arm 63 of said L-shaped lever 57 to cause the lever 57 to rotate in the counterclockwise direction as shown in FIG. 2B. By the counterclockwise rotation of the lever 57, one end of the center-over spring 56 is pushed toward the other end storing a force to snap the bracket member upward. When the reciprocating plate member 55 is slid further in the direction of arrow A, said pin 59 fixed thereon abuts the inclined surface of the lug 60 to lift the bracket member 52. This triggers snapping action of the center-over spring 56 thereby rapidly swinging the bracket member 52 in the counterclockwise direction to move the pinch roller 51 to its operative position in which the pinch roller 51 is pressed against the capstan 50 as shown in FIG. 2C. As will be described hereinafter, the sliding movement of the reciprocating member 55 in the direction of arrow A is initiated in response to depression of the shutter button and is stopped when the pinch roller is moved to its operative position. When the shutter button returns to its original position, the reciprocating plate member 55 is slid in the direction opposite to the direction of the arrow A. When the plate member 55 is moved in the direction opposite to the direction of the arrow A, the right side edge of the cut-out portion 64 presses the L-shaped lever 57 to cause it to rotate in the clockwise direction, thereby returning the bracket member 52 to its original position shown in FIG. 2A together with the pinch roller 51. When the reciprocating plate member 55 reaches its original position, it is stopped.

Reciprocating plate member 55 is driven by an electric motor M as shown in FIG. 1. A worm gear 66 is operatively connected to the motor M to be rotated thereby. The worm gear 66 is in driving engagement with a gear 67 rotatably supported in the camera body. From the lower surface of the gear 67 downwardly extends an engaging pin 68. The engaging pin 68 extends into an elongated slot 69 formed in the reciprocating plate member 55 at one end thereof remote from the cut-out portion 64. By this arrangement, the reciprocating plate member 55 is moved back and forth upon rotation of the gear 67. The reciprocating movement of the plate 55 occurs once for each rotation of the gear 67.

Figure 3:
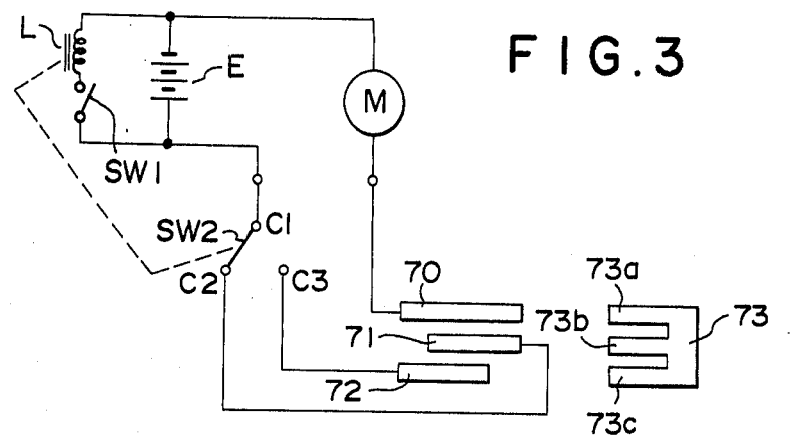
FIG. 3 is a circuit diagram for controlling the driving motor.

The motor M can be controlled, for example, by a circuit shown in FIG. 3.

In FIG. 3 the motor M is connected between a power source E and an elongated common contact 70. A trigger switch SW1 is connected to the power source E in parallel to the motor M through a relay coil L of a relay switch SW2. The relay switch SW2 has a common movable contact C1 and first and second fixed contacts C2 and C3, the movable contact C1 being selectively put into contact with the fixed contacts C2 and C3. The movable contact C1 is normally in contact with the first fixed contact C2 and is put into contact with the second fixed contact C3 when the relay coil L is excited. The movable contact C1 is connected to the power source E, while the first and second fixed contacts C2 and C3 are connected to first and second elongated contacts 71 and 72, respectively. A three-forked brush member 73 having first, second and third legs 73a, 73b and 73c selectively bridges the common elongated contact 70 and the first and second elongated contacts 71 and 72.

As shown in FIG. 1, the elongated contacts 70, 71 and 72 are carried on a first plate 74 which is fixedly located adjacent and in parallel to the reciprocating plate member 55.

The three forked brush member 73 is fixed to a slidable second plate 75. The slidable second plate 75 has a pair of laterally extending elongated slots 76 into which a pair of stud pins 76a projecting from the outer surface of the first plate 74 is inserted. The first plate 74 is provided with a laterally extending elongated opening 77. An elongated projection 78 is integrally formed on the side edge of the reciprocating plate member 55 facing the plate 74 and extends through the elongated opening 77. The free end 78a is frictionally engaged with an opening 79 formed in the intermediate portion of the slidable second plate 75 so that the second plate 75 is moved along the first plate 74 accompanied by the reciprocating plate member 55. The movement of the second plate 75 is guided by means of the elongated slots 76 and the stud pins 76a.

The relative positioning of the first and second plates 74 and 75 is selected so that when the reciprocating plate member 55 is in its initial position shown in FIG. 2A the first and third legs 73a and 73c of the brush member 73 are in contact with the elongated common contact 70 and the second elongated contact 72, respectively, and the second leg 73b is out of contact with the first elongated contact 71.

When the shutter button of the camera is depressed and the trigger switch SW1 is closed, the coil L of the relay switch SW2 is excited to put into contact the movable contact C1 of the relay switch SW2 with the second fixed contact C3 thereof. Thus, the motor M is energized to rotate the worm gear 66 thereby driving the reciprocating plate member in the direction of the arrow A, since the elongated common contact 70 and the second elongated contact 72 are bridged by the brush member 73 at this time. When the reciprocating plate member 55 is slid rightward in FIG. 1, the second plate 75 is also moved relative to the first plate 74 and the second leg 73b of the brush member 73 is put into contact with the first elongated contact 71. When the reciprocating plate member 55 is further slid rightward and the second plate 75 is further moved rightward, the third leg 73c of the brush member 73 comes out of contact with the second elongated contact 72 while the first and second legs 73a and 73c are still kept in contact with the common elongated contact 70 and the first elongated contact 71, respectively. In this position said pinch roller 51 is moved to its operative position as described above, and since the common elongated contact 70 and the second elongated contact 72 are no longer bridged by the brush member 73 and at the same time the first fixed contact C2 of the relay switch SW2 is not in contact with the movable contact C1 though the common elongated contact 70 and the first elongated contact 71 are bridged by the brush member 73, the motor M is de-energized to stop the translating plate member 55.

Thereafter, when the shutter button is released and the trigger switch SW1 is opened, the movable contact C1 of the relay switch SW2 returns to its normal position in which it is in contact with the first fixed contact C2. Then, the motor M is again energized through the common elongated contact 70, the brush member 73, the first elongated contact 71 and the relay switch SW2. Accordingly, the gear 67 is turned to slide the reciprocating member leftward. The second plate 75 is also moved leftward toward its initial position accompanied by the reciprocating plate member 55. When the reciprocating plate member 55 and the second plate 55 reach their initial position, the second leg 73b of the brush member is again out of contact with the first elongated contact 71. Then the motor M is stopped again, since the movable contact C1 of the relay switch SW2 is not in contact with the second fixed contact C3 at this time though the common elongated contact 70 is connected with the second elongated contact 72 through the brush member 73.

Said lever 34 may effectively be connected to the reciprocating plate member 55 instead of being connected to the lid member of the film cartridge chamber so that the lever 34 is rotated in the clockwise direction to cause the head pad 30, the movable film guide member 20 and the loop sensor 10 to move to their operative positions.

Signal switches such as an electric eye switch, fading start switch and the like may be mounted on the slidable second plate 75. With such an arrangement such switches can be properly operated regardless of how rapidly the shutter button is depressed.

I claim:

1. A film feeding device for a sound motion picture camera for continuously advancing film past a sound recording head comprising
a capstan which rotates at a constant speed,
a pinch roller cooperating with the capstan to advance the film and movable between an operative position in which the pinch roller is pressed against the capstan to pinch the film between the pinch roller and the capstan and a retracted position in which the pinch roller is spaced from the capstan,
a movable support member for rotatably supporting the pinch roller, said support member being movable between a first position in which the movable support member holds the pinch roller in the retracted position and a second position in which the movable support member holds the pinch roller in the operative position,
a reciprocating member which is driven back and forth between an initial position and an extreme position by means of an electric motor, said movable support member being moved to the second position when the reciprocating member is driven toward the extreme position and returned to the first position when the reciprocating member is reversed to the initial position, and a motor control circuit means including a trigger switch which is turned on and off associated with a shutter release button of the camera, the motor control circuit means being arranged to energize the motor when the trigger switch is turned on keep the motor energized until said reciprocating member reaches the extreme position, deenergize the motor when the reciprocating member is in the extreme position and energize the motor again when the trigger switch is opened.

2. A film feeding device as defined in claim 1 wherein said movable support member is connected to the reciprocating member through a center-over spring so that the movable support member is momentarily moved from one of said two positions to the other upon movement of the reciprocating member in one direction.

3. A film feeding device as defined in claim 1 wherein said reciprocating member is effectively connected to the electric motor through a cam means so that the reciprocating member is moved back and forth by unidirectional rotation of the motor.

4. A film feeding device as defined in claim 1 wherein said motor control circuit comprises a first circuit which is closed to energize the motor upon closure of the trigger switch when said reciprocating member is in its initial position and is opened to deenergize the motor when the reciprocating member reaches its extreme position with the trigger switch closed, and a second circuit which is closed to energize the motor upon opening of the trigger switch when the reciprocating member is in its extreme position and is opened to deenergize the motor when the reciprocating member is returned to its initial position.

5. A film feeding device as defined in claim 4 wherein said second circuit is controlled by a relay switch which is in turn controlled by the trigger switch.

* * * * *